United States Patent [19]

Rosenberger

[11] 4,220,571
[45] Sep. 2, 1980

[54] THERMOPLASTIC POLYOLEFIN COMPOSITION AND PROCESS FOR STABILIZING POLYOLEFINS

[75] Inventor: Siegfried Rosenberger, Riehen, Switzerland

[73] Assignee: Ciba-Geigy Corporation, Ardsley, N.J.

[21] Appl. No.: 950,522

[22] Filed: Oct. 11, 1978

Related U.S. Application Data

[63] Continuation of Ser. No. 767,935, Feb. 11, 1977, abandoned.

[30] Foreign Application Priority Data

Feb. 19, 1976 [SE] Sweden ................................ 2032/76

[51] Int. Cl.² ............................................... C08K 5/21
[52] U.S. Cl. ..................... 260/45.9 NC; 260/45.85 B; 260/45.95 R; 260/45.95 C; 260/45.95 E; 260/45.95 H; 260/45.95 D; 260/45.8 NZ

[58] Field of Search .................. 260/45.9 NC, 45.8 N, 260/45.8 NZ, 45.8 SN, 45.95 R, 45.85 B

[56] References Cited

U.S. PATENT DOCUMENTS

| 3,004,035 | 10/1961 | Csendes | 260/45.9 NC |
| 3,211,692 | 10/1965 | Hopkins et al. | 260/32.6 |
| 3,394,104 | 7/1968 | Hotlen | 260/45.9 NC |

FOREIGN PATENT DOCUMENTS 1669745  7/1971  Fed. Rep. of Germany .
 876710  9/1961  United Kingdom .

Primary Examiner—V. P. Hoke
Attorney, Agent, or Firm—Wenderoth, Lind & Ponack

[57] ABSTRACT

Polyolefins are outstandingly protected against thermooxidative degradation by the use of aliphatic substituted ureas, especially together with phenolic antioxidants, and good color characteristics are observed.

8 Claims, No Drawings

THERMOPLASTIC POLYOLEFIN COMPOSITION AND PROCESS FOR STABILIZING POLYOLEFINS

This is a continuation of application Ser. No. 767,935, filed Feb. 11, 1977, now abandoned.

The present invention relates to polyolefins stabilised with urea derivatives and to a process for stabilising polyolefins during processing.

Under the conditions of processing, thermoplastic molding compositions frequently undergo thermooxidative degradation and it is therefore generally necessary to add stabilisers which counteract this degradation. Thermoplastic polymers display degradation which, in general, is determined by the structure of the polymer. As is known, it is for this reason that certain substances and categories of substances are particularly effective in one polymer, while with other polymers no stabilising effect or only a lesser stabilising effect can be observed.

A category of compounds known as stabilisers for polyolefins are sterically hindered phenols, such as, for example, 2,6-di-tert.-butyl-4-methylphenol, which impart effective protection during processing (short-term stabilisation) and in the finished molding also effect good protection against degradation at elevated temperatures over a prolonged period, which ensures better properties of the molding in use. A disadvantage of these stabilisers is that they can lead to discolorations in the substrate under the conditions of processing.

It is known from J. Voigt, Chemie, Physik und Technologie der Kunststoffe, (Chemistry, Physics and Technology of Plastics), Springer Verlag 1966, pages 300 to 302, to employ urea derivatives together with costabilisers for heat stabilisation of PVC. The stabilisation of other polymers, such as, for example, polyacetals, polyvinyl fluoride, silicone rubber or styrene is also described in this publication. Furthermore, it is mentioned that discolorations due to the action of light can be prevented in vulcanised rubbers with urea derivatives and this is also a subject of British Pat. No. 876,710. However, the heat stabilisation of polyolefins is not mentioned.

In U.S. Pat. No. 3,394,104, benzylurea derivatives are proposed as antioxidants for polyolefins. However, it has been found that, after processing, inadequate color characteristics are to be observed in polyolefins stabilised in this way.

In Japanese Pat. No. 292,535 (Publication number 12,789/61) it is proposed to use monosubstituted thiourea derivatives, such as, for example, dicyclohexylthiourea, to protect polyolefins against degradation during processing. It is said that an improvement in the coloristic quality of the substrate is also achieved in this way. However, it has been found that the discoloration of the substrate is reduced to only an inadequate extent with these urea derivatives and in this respect is in some cases even greater than with phenolic antioxidants.

The object of the present invention is to provide molding compositions which are based on polyolefins and are stabilised with substituted urea derivatives and are effectively protected against thermooxidative degradation under conditions of processing, for example those of injection molding processes or extrusion processes, and with which the finished moldings should display no discoloration or at most slight discoloration.

The subject of the present invention is a polyolefin molding composition which is stabilised with substituted urea derivatives and contains (a) an aliphatic polyolefin which is derived from one or more monoolefins and (b) a substituted urea of the formula I

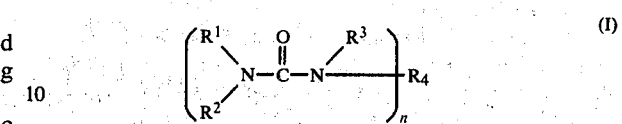

in which n is 1 and $R^1$ to $R^4$ denote a hydrogen atom or a monovalent hydrocarbon group of aliphatic character, which can be substituted by hydroxyl, carboxyl or a carboxylic acid ester group and, when n is 1, at least one of the radicals $R^1$ to $R^4$ represents this hydrocarbon group, or $R^1$ and $R^2$, or $R^3$ and $R^4$, conjointly denote alkylene which is optionally substituted and/or interrupted by an oxygen atom or sulphur atom, or n is 2 and $R^1$ to $R^3$ have the abovementioned meaning and $R^4$ denotes a divalent hydrocarbon group of aliphatic character, or $R^3$ and $R^4$, together with the N atoms, form an optionally substituted divalent radical of a cyclic aliphatic diamine, there being at least one N atom in the ring.

$R^1$ and $R^3$ in formula I are preferably a hydrogen atom. Furthermore, the urea derivatives of the formula I are preferably symmetrical and at least one of the radicals $R^1$ to $R^4$ preferably contain at least 6 carbon atoms. The monovalent hydrocarbon group preferably contains 1 to 30, and especially 4 to 18, C atoms and the divalent hydrocarbon group preferably contains 1 to 22, and preferentially 2 to 12 C atoms.

$R^1$ to $R^4$, or $R^1$ and $R^2$, and also $R^3$ and $R^4$ conjointly can be polysubstituted, and preferably monosubstituted to disubstituted, preferably by linear or branched alkyl which contains 1 to 18, and especially 1 to 12, carbon atoms or by cycloalkyl with 5 to 12, and especially 5 to 7, ring carbon atoms, in particular cyclopentyl or cyclohexyl. $R^1$ and $R^2$, and $R^3$ and $R^4$ conjointly can be substituted by hydroxy, carboxyl, or a carboxylic acid ester group.

$R^1$ and $R^4$ can be linear or branched alkyl with preferably 1 to 22, and especially 4 to 18, carbon atoms or optionally substituted cycloalkyl or cycloalkylalkylene with preferably 5 to 12, and especially 6, carbon atoms in the ring. Cycloalkyl is also understood to include polycyclic radicals. The alkylene group in cycloalkylalkylene preferably contains 1 to 3 carbon atoms and in particular contains 1 carbon atom. The cycloalkyl can preferably be substituted by alkyl with 1 to 12, and especially 1 to 8, carbon atoms.

Examples are methyl, ethyl, propyl, i-propyl, butyl, i-butyl, pentyl, α-methylpentyl, hexyl, 2,4-dimethylpentyl, octyl, i-octyl, decyl, dodecyl, octadecyl, octadecylethyl, eicosanyl, docosanyl, triacontyl, cyclopentyl, 3,4-dimethylcyclopentyl, methylcyclopentyl, cyclohexyl, methylcyclohexyl, 4,6-dimethylcyclohexyl, 2-ethylcyclohexyl, octylcyclohexyl, cycloheptyl, cyclooctyl, cyclododecyl, cyclohexylmethyl, cyclopentylethyl, methylcyclohexylmethyl, 2,2,1-bicycloheptyl, 2,2,2-bicyclooctyl, 2,2,1-bicycloheptylmethyl and tetrahydrobicyclopentadienyl.

$R^1$ and $R^2$, or $R^3$ and $R^4$, together with the nitrogen atom to which they are linked can denote the monovalent radical of a cyclic aliphatic amine which preferably has 5 to 7 ring members and is optionally substituted and/or contains a thioether or ether group; examples of such amines which may be mentioned are: pyrrolidine, piperidine, α-methylpyrrolidine, α,α'-dimethylpyrrolidine, α-methylpiperidine, morpholine, 1-nitrogen-4-thiacyclohexane, indole and 1,2-dihydro- or 1,2,3,4-tetrahydro-quinoline. A preferred substituent is alkyl with 1 to 4 carbon atoms.

If $R^4$ denotes an optionally substituted divalent radical of aliphatic character, this can be linear or branched alkylene or alkylidene which as preferably 1 to 22, and especially 1 to 12, carbon atoms and can also be interrupted by cycloalkyl with 5 or 6 ring carbon atoms. It can also be optionally substituted cycloalkylene or cycloalkylenealkylene with 5 to 12, preferably 5 or 6, carbon atoms in the ring and 1 to 3 carbon atoms in the alkylene chain.

A possible substituent of the above groups is, for example, alkyl, preferably with 1 to 8 carbon atoms. Examples are: methylene, ethylene, ethylidene, 2-octadecylethylene, hexylethylene, 1,2- or 1,3-propylene, propylidene, 1,2-, 1,3- or 1,4-butylene, butylidene, pentylene, 1,2-octylene, 1,8-octylene, dodecylene, octadecylene, docosanylene, 1,2- or 1,3-cyclopentylene, 1,2-, 1,3- or 1,4-cyclohexylene, 2-methylcyclopentylene, 3-methyl-p-cyclohexylene, cyclododecylene, 1,8-cycloheptylenemethyl, p-cyclohexylenemethyl, p-cyclohexylenedimethyl, cyclopentylenemethyl, 3,5,5-trimethyl-1-cyclohexylene-3-methyl, di-(p-cyclohexylene)-methane, bis-(3-methyl-p-cyclohexylene)-methane and 2,2-di-(p-cyclohexylene)-propane.

$R^3$ and $R^4$, together with the nitrogen atom to which they are linked, can form an optionally substituted divalent radical of a cyclic aliphatic diamine, there being at least one amine group in the ring. The radical preferably contains a total of 5 or 6 ring members and is preferably a saturated radical. Examples which may be mentioned are: 1,4-piperazinylene, 1,3-imidazolidinylene, 1,3-piperazinylene, 1,2-pyrazolidinylene or radicals of the formulae

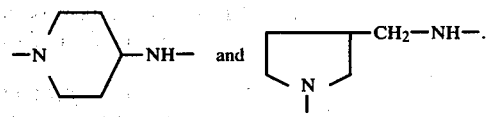

A sub-group comprises those compounds of the formula I in which $R^1$ to $R^4$ contain a quaternary α-C atom when they denote alkyl or when $R^4$ denotes alkylene or, when they denote cyclic monovalent or divalent groups, are substituted in the two o-positions by, in particular, alkyl with 1 to 12 C atoms. Examples of these groups are: t-butyl, 1,1-dimethylpropyl, 1,1-dimethylbutyl, 1-methyl-1-ethylethyl, 1-cyclohexyl-1-methylbutyl, 1-phenyl-1-ethylpropyl, 1,1-diphenylethyl, 1-benzyl-1-methylpropyl, 1-dodecyl-1-methylethyl, 1,1,3,3-tetramethylbutyl, 1,1-dimethyldodecyl, 2,5-dimethylcyclopentyl, 2,6-dimethylcyclohexyl, 2-ethyl-6-methylcyclohexyl, 2-phenyl-6-methylcyclohexyl and 2,4,6-trimethylcyclohexyl. Preferred radicals are 1,1,3,3-tetramethyl-butyl and -butylene and t-butyl.

If the groups $R^1$ to $R^4$ are substituted by a carboxylic acid ester group, the latter preferably contains 1 to 19 C atoms. The groups $R^1$ to $R^4$ can also be substituted by carboxyl or hydroxyl. Examples of $R^1$ to $R^4$ groups substituted in this way are: hydroxymethyl, α- or β-hydroxyethyl, hydroxypropyl, hydroxybutyl, tris-(hydroxymethyl)-methyl, carboxymethyl, carboxyethyl, carboxypropyl, carboxybutyl, carboxycyclohexyl, alkoxycarbonylmethyl, alkoxycarbonylethyl, alkoxycarbonylpropyl, alkoxycarbonylbutyl and alkoxycarbonylcyclohexyl with 1 to 18 C atoms in the alkoxy group or cycloalkoxycarbonylmethyl or cycloalkoxycarbonylethyl with 5 or 6 C atoms in the cycloalkyl group.

The urea derivatives of the formula I can be manufactured according to processes which have been known for a long time. Suitable processes which may be mentioned are:

(a) The reaction of the carboxylic acid halides, especially phosgene, with corresponding amines, aminocarboxylic acids or aminocarboxylic acid esters. This reaction is generally carried out in the presence of an acid-binding agent, such as tertiary amines, hydroxides, carbonates or bicarbonates, and of an inert solvent.

(b) The reaction of optionally substituted carbamic acid halides, especially of the chlorides, with optionally substituted amines or diamines. In general, the reaction is carried out as in the case of (a). Asymmetrical derivatives are also readily accessible by this process.

(c) The reaction of urea with optionally substituted amines with the elimination of ammonia. In this case, the reaction is preferably carried out in an excess of the amine which at the same time serves as the solvent.

(d) The reaction of an optionally substituted isocyanate with an optionally substituted amine or diamine. The reaction is generally carried out in the presence of a solvent. This method also gives asymmetrical urea derivatives.

Suitable solvents are, in particular, aliphatic and aromatic hydrocarbons, such as pentane, hexane, cyclohexane, ligroin, benzene and toluene. The methods of preparation are described, for example, in Weygand/Hilgetag - Organisch chemische Experimentierkunst (Experimental Techniques in Organic Chemistry), 1970, pages 420, 484 and 554.

Even when added in small amounts, the urea derivatives of the formula I provide outstanding protection for the polyolefins against thermooxidative degradation under conditions of processing, especially when the polyolefin is in the molten state. The mechanical properties remain largely unchanged and, particularly surprisingly, in addition no discoloration, or only a slight discoloration, of the substrate is observed.

Suitable poleolefins which are derived from monoethylenically unsaturated hydrocarbons are, for example, in particular polyethylene, which can optionally be crosslinked, and polypropylene as well as polymethylbut-1-ene, polymethylpent-1-ene, polybut-1-ene, polyisobutylene, copolymers of the monomers on which the said homopolymers are based, such as ethylene/propylene copolymers; propylene/but-1-ene copolymers and propylene/isobutylene copolymers; and mixtures of the abovementioned homopolymers, such as, for example, mixtures of polypropylene and polyethylene, polypropylene and polybut-1-ene and of polypropylene and polyisobutylene.

A further subject of the present invention is a process for stabilising polyolefins against thermooxidative degradation during processing, which process is characterized in that at least one compound of the formula I is added to the polyolefin.

The compounds of the formula I are incorporated in the substrates in a concentration of 0.005 to 5% by weight, calculated relative to the material to be stabilised.

Preferably 0.01 to 1.0, and particularly preferentially 0.02 to 0.5% by weight of the compounds, calculated relative to the material to be stabilised, are incorporated into the latter. Incorporation can be effected, for example, by mixing in at least one of the compounds of the formula I, and optionally further additives, by the methods customary in industry, before or during shaping, or by applying the dissolved or dispersed compounds to the polymer, if appropriate with subsequent evaporation of the solvent.

Examples which may be mentioned of further additives, together with which the stabilisers can be employed, are: UV absorbers and light stabilisers, such as 2-(2'-hydroxyphenyl)-benztriazoles, 2,4-bis-(2'-hydroxyphenyl)-6-alkyl-s-triazines, 2-hydroxybenzophenones, 1,3-bis-(2'-hydroxybenzoyl)-benzenes, esters of optionally substituted benzoic acids, acrylates and, furthermore, nickel compounds, sterically hindered amines, oxalic acid diamides, metal deactivators, such as acyl hydrazides, phosphites, compounds which destroy peroxide, basic costabilisers, nucleating agents or other additives, such as, for example, salts of higher fatty acids, plasticisers, lubricants, emulsifiers, fillers, carbon black, asbestos, kaolin, talc, glass fibers, pigments, optical brighteners, flameproofing agents and antistatic agents.

Examples of further additives which can be used with the stabilisers according to the invention, are given on pages 18–24 of German Offenlegungsschrift No. 2,427,853.

When phenolic antioxidants are additionally used for long term stabilisation, it is to be regarded as particularly advantageous that these can be added in a smaller amount. In this way adequate stability to aging coupled with outstanding and improved stability to processing is achieved and, at the same time, discoloration of the substrate is largely avoided. Thus, it is possible, surprisingly, to achieve considerably better stability to processing with a smaller amount of ureas of the formula I when a phenolic antioxidant is present at the same time in approximately the same amount or less and ultimately this can be explained only by a synergistic interaction of the individual components.

Examples which may be mentioned of phenolic antioxidants which are additionally to be used are:

1. Antioxidants 1.1 Simple 2,6-dialkylphenols, such as, for example, 2,6-di-tert.-butyl-4-methylphenol, 2-tert.-butyl-4,6-dimethylphenol, 2,6-di-tert.-butyl-4-methoxymethylphenol and 2,6-dioctadecyl-4-methylphenol.

1.2 Derivatives of alkylated hydroquinones, such as, for example, 2,5-di-tert.-butyl-hydroquinone, 2,5-di-tert.-amylhydroquinone, 2,6-di-tert.-butylhydroquinone, 2,5-di-tert.-butyl-4-hydroxy-anisole, 3,5-di-tert.-butyl-4-hydroxy-anisole, tris-(3,5-di-tert.-butyl-4-hydroxyphenyl) phosphite, 3,5-di-tert.-butyl-4-hydroxyphenyl stearate and bis-(3,5-di-tert.-butyl-4-hydroxyphenyl) adipate.

1.3. Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl) disulphide.

1.4. Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di-(3-tert.-butyl-5-methyl-2-hydroxybenzyl)-4-methylphenol, 2,2'-methylene-bis-[4-methyl-6-(α-methylcyclohexyl)-phenol], 1,1-bis-(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane and ethylene glycol bis-[3,3-bis-(3'-tert.-butyl-4'-hydroxyphenyl)-butyrate].

1.5 O-, N- and S-benzyl compounds, such as, for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl) dithioterephthalate.

1.6 Hydroxybenzylated malonates, such as, for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)-phenyl] 2,2-bis-(3,5-di-tert.-butyl-4-hydroxybenzyl)-malonate.

1.7 Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert.-butyl-4-hydroxybenzyl)-2,3,5,6-tetramethylbenzene and 2,4,6-tri-(3,5-di-tert.-butyl-4-hydroxybenzyl)-phenol.

1.8 s-Triazine compounds, such as, for example, 2,4-bis-octylmercapto-6-(3,5-di-tert.-butyl-4-hydroxyanilino)-s-triazine, 2-octylmercapto-4,6-bis-(3,5-di-tert.-butyl-4-hydroxyanilino)-s-triazine, 2octylmercapto-4,6-bis-(3,5-di-tert.-butyl-4-hydroxyphenoxy)-s-triazine,2,4,6- tris-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl) isocyanurate.

1.9 Amides of β-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di-(3,5-di-tert.-butyl-4-hydroxyphenyl-propionyl)-hexamethylenediamine.

1.10 Esters of β-(3,5-di-tert.-butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2] octane.

1.11 Esters of β-(5-tert.-butyl-4-hydroxy-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentylglycol, pentaerythritol, 3-thia-undecanol, 3-thia-pentadecanol, trimethylhexanediol trimethylolethane, trimethylolpropane, tris-hydroxyethyl isocyanurate and 4-hydroxymethyl-1-phospha-2,6,7-trioxabicycol[2,2,2]octane.

1.12 Esters of 3,5-di-tert.-butyl-4-hydroxyphenylacetic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thio-diethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2]-octane, especially the tetra-bis ester of pentaerythritol.

1.13 Benzylphosphonates, such as, for example, dimethyl 3,5-di-tert.-butyl-4-hydroxybenzyl-phosphonate, diethyl 3,5-di-tert.-butyl-4-hydroxybenzyl-phosphonate, dioctadecyl 3,5-di-tert.-butyl-4-hydroxybenzyl-phosphonate and dioctadecyl 5-tert.-butyl-4-hydroxy-3-methylbenzyl-phosphonate.

zylurea (stabiliser C), N,N'-dicyclohexylthiourea (D), N,N'-diphenylthiourea (E), N,N'-diphenylethylene-bis-thiourea (F) and N,N'-didodecylthiourea (G) are also tested as comparison substances. The granules obtained after the 1st, 3rd and 5th extrusion are, moreover, pressed in a platen press at 260° C. for 10 minutes to give 1 mm thick sheets and the discoloration of these sheets is assessed visually by comparison with a blank test or a comparison test. That is to say relative values are compared. According to experience, pressing a sheet from granules effects no further discoloration. An empirical color scale in which the degree of discoloration increases from rating 5 to rating 1 is used. The values after the 5th extrusion are of significance here in practice. It can be seen from Table 1 that the color characteristics of the compositions according to the invention are superior.

In addition, 0.05% by weight of ureas (1) and (3) together with an equal amount (0.05% by weight) of the phenolic antioxidant A are used. The significant increase in the action during processing, when compared with A and urea (1) or (3). when the same total amount of stabiliser is used, is obvious from Table 1 and, with regard to the color values, identical or better results are found.

Table I

| Stabiliser | MI/2160 g at 230° C. in g/10 minutes after multiple extrusion | | | Color comparison of the sheets after multiple extrusion | | |
|---|---|---|---|---|---|---|
| | 1x | 3x | 5x | 1x | 3x | 5x |
| without | 11–13 | 20–40 | 30–70 | 5 | 5 | 5 |
| Comparison examples | | | | | | |
| A | 6.1 | 8.7 | 11.5 | 3 | 2 | 2 |
| B | 5.0 | 6.6 | 8.2 | 3 | 3 | 3 |
| C | 4.1 | 6.4 | 9.3 | 3 | 2 | 2 |
| D | 3.4 | 5.3 | 9.0 | 2 | 3 | 2 |
| E | 2.9 | 4.4 | 7.3 | 1 | 1 | 1 |
| F | 4.2 | 6.2 | 8.2 | 1 | 1 | 1 |
| G | 4.1 | 6.2 | 8.7 | 2 | 2 | 2 |
| N,N'-Di-(1,1,3,3-tetramethyl-n-butyl)-urea (1) | 4.9 | 7.5 | 9.2 | 5 | 5 | 5 |
| 1,1,4,4-Tetramethyl-n-butylene-bis-omega-N-n-octadecylurea (2) | 4.7 | 6.3 | 9.0 | 2–3 | 4 | 4 |
| N,N'-Di-n-dodecylurea (3) | 5.0 | 7.8 | 10.9 | 5 | 5 | 4 |
| 1,1,4,4-Tetramethyl-n-butylene-bis-omega-N-t.-butylurea (4) | 5.2 | 7.8 | 12.6 | 5 | 5 | 5 |
| N,N-Di-n-octyl-N,N'-cyclopentamethyleneurea (5) | 5.1 | 7.0 | 10.3 | 5 | 5 | 5 |
| N,N,N',N'-Bis-cyclopentamethyleneurea (6) | 5.0 | 7.6 | 11.8 | 5 | 4 | 4 |
| (1) + A | 2.9 | 4.0 | 5.2 | 4 | 4 | 4 |
| (3) + A | 2.8 | 3.8 | 5.2 | 4 | 3 | 2 |

The examples which follow serve to illustrate the invention. In these examples parts denote parts by weight and % denotes percentages by weight.

EXAMPLE 1

Stabilisation of polypropylene against thermooxidative degradation under processing conditions The stabilisers listed in Table 1 are mixed homogeneously, in a concentration of 0.1%, with polypropylene powder from Messrs. ICI ("Propathen HF 20" type) and the mixtures are granulated 5 times successively in a single screw extruder at a maximum of 260° C and at 100 revolutions/minute. The melting index (MI) of the material (2,160g load at 230° C.;/g10 minutes) is measured after the 1st, 3rd and 5th extrusion in each case. Degradation of the polymer is expressed by a rapid rise in the melt index.

Pentaerythritol tetrakis-[3-(3',5'-di-t.-butyl-4-hydroxyphenyl)]-propionate (stabiliser A) and 4-methyl-2,6-di-t.-butylphenol (stabiliser B) and N-phenyl-N'-ben-

EXAMPLE 2

Stabilisation of high molecular weight high density polyethylene against thermooxidative degradation under processing conditions The urea (1) indicated in Table 1 is incorporated, in a concentration of 0.1% by weight, in polyethylene (Lupolen 5260 Z, unstabilised, BASF) in a Brabender plastograph at 220° C. and 50 revolutions per minute. The kneading time in minutes which elapses before there is a change in the power absorption serves as a measure of the stabilisation. The result is given in Table 2.

Table 2

| Stabiliser | Kneading time in minutes |
|---|---|
| Without a stabiliser | 2 |

Table 2-continued

| Stabiliser | Kneading time in minutes |
| --- | --- |
| Urea (1) | 4 |

What is claimed is:

1. A polyolefin molding composition which is stabilised against thermooxidative degradation with a substituted urea derivative, which composition contains
   (a) an aliphatic polyolefin which is derived from one or more hydrocarbon monoolefins,
   (b) 0.005 to 5% by weight of said polyolefin of a substituted urea of the formula I

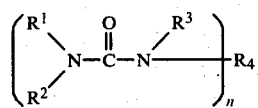

in which n is 1, $R^1$ and $R^3$ are each hydrogen, and $R^2$ and $R^4$, independently of each other, are each an unsubstituted alkyl group containing 4 to 18 carbon atoms, and
   (c) a sterically hindered phenolic antioxidant in a positive amount of up to the amount of the substituted urea of formula I.

2. A molding composition according to claim 1, wherein the sterically hindered phenolic antioxidant is selected from the group consisting of 2,6-dialkyl-phenols, derivatives of alkylated hydroquinones, hydroxylated thiodiphenyl ethers, alkylidene bisphenols, O-, N- and S- benzyl compounds, hydroxybenzylated malonates, hydroxybenzyl aromatic compounds, hindered phenolic group-containing s-triazine compounds, amides of $\beta$-(3,5-di-tert-butyl-4-hydroxyphenyl)-propionic acid, esters of $\beta$-(3,5-di-t-butyl-4-hydroxyphenyl)-propionic acid, esters of $\beta$-(5-t-butyl-4-hydroxy-3-methylphenyl)-propionic acid, esters of 3,5-di-t-butyl-4-hydroxyphenyl acetic acid and benzylphosphates.

3. A molding composition according to claim 1, wherein at least one of $R^2$ and $R^4$ denotes alkyl containing 4 to 18 carbon atoms in which one of said carbon atoms is a quaternary $\alpha$-C atom.

4. A process for stabilising an aliphatic polyolefin derived from one or more hydrocarbon monoolefins, against thermooxidative degradation during processing of said polyolefin, which comprises incorporating a stabilising amount of at least one substituted urea of the formula I according to claim 1, and in addition a sterically hindered phenolic antioxidant, into the polyolefin.

5. A molding composition according to claim 1, wherein the polyolefin is polypropylene or polyethylene.

6. A molding composition according to claim 1 which contains N,N'- di-(1,1,3,3-tetramethyl-n-butyl)-urea.

7. A molding composition according to claim 1 which contains the urea of the formula I in an amount of 0.01 to 1.0% by weight, relative to the polyolefin.

8. A molding composition according to claim 2, wherein the antioxidant is pentaerythritol tetra-kis-[3-(3',5'-di-t.-butyl-4-hydroxyphenyl)]-propionate.

* * * * *